Feb. 7, 1956   E. LATTA   2,733,609
ELECTRIC WINDSHIELD WIPER APPARATUS
Filed Dec. 14, 1953   4 Sheets-Sheet 1

INVENTOR
EDWARD LATTA
BY
ATTORNEYS

Feb. 7, 1956 E. LATTA 2,733,609
ELECTRIC WINDSHIELD WIPER APPARATUS
Filed Dec. 14, 1953 4 Sheets-Sheet 2

INVENTOR
EDWARD LATTA
BY
James + Franklin
ATTORNEYS

Feb. 7, 1956             E. LATTA             2,733,609

ELECTRIC WINDSHIELD WIPER APPARATUS

Filed Dec. 14, 1953             4 Sheets-Sheet 3

RUNNING SEQUENCE

INVENTOR
EDWARD LATTA
BY
ATTORNEYS

Feb. 7, 1956  E. LATTA  2,733,609
ELECTRIC WINDSHIELD WIPER APPARATUS
Filed Dec. 14, 1953  4 Sheets-Sheet 4

PARKING SEQUENCE

INVENTOR
EDWARD LATTA
BY
ATTORNEYS

United States Patent Office 2,733,609
Patented Feb. 7, 1956

2,733,609

ELECTRIC WINDSHIELD WIPER APPARATUS

Edward Latta, Owosso, Mich., assignor to Redmond Company, Inc., Owosso, Mich., a corporation of Michigan Application December 14, 1953, Serial No. 397,999

5 Claims. (Cl. 74—75)

This invention relates to improvements in electric windshield wiper apparatus.

The prime object of the present invention centers about the provision of an improved apparatus for connecting a reversible motor-operated shaft with an oscillatable windshield wiper operative for shifting the stroke of the windshield wiper for moving the latter to a parked position upon a reversal of direction of operation of the motor.

In carrying out this object of the invention the apparatus features the provision of an eccentric device which is actuated in a positive manner when the motor is reversed from its normal direction of operation for shifting the stroke of the windshield wiper from a normal running sequence to a parking sequence and when the motor is reversed back to its normal direction of operation for shifting the stroke of the windshield wiper back from a parking position to a normal running sequence.

To the accomplishment of this object and such other objects as may hereinafter appear the invention relates to the combination apparatus as sought to be defined in the appended claims, taken together with the following description and shown in the accompanying drawings, in which:

Figure 1:
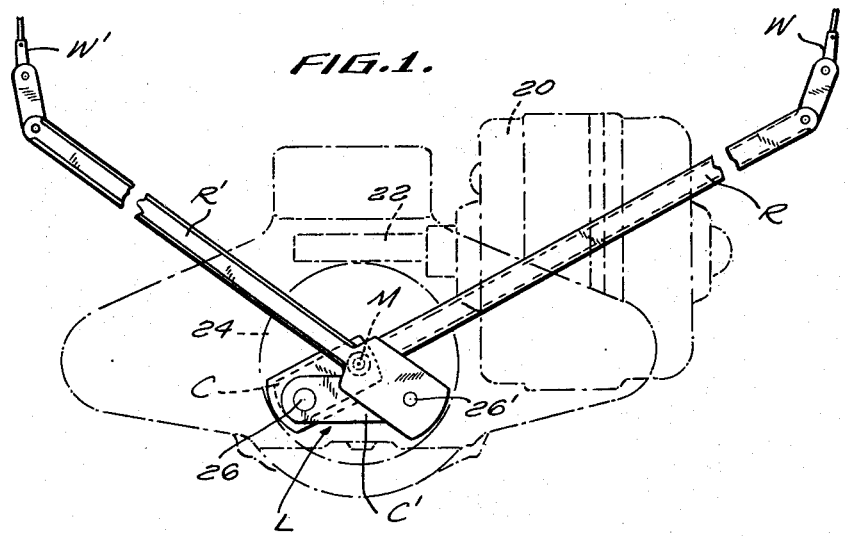
Fig. 1 is a front elevational view showing schematically the apparatus of the present invention in an applied state.

Referring now more in detail to the drawings, and having reference first to Fig. 1 which shows the mode of application or use of the apparatus of the present invention, the apparatus comprises a linkage mechanism, generally designated as L, for connecting a motor-operated shaft M with the right and left oscillatable windshield wiper devices W and W'. The shaft M is driven by an electric motor 20 through reduction gearing schematically illustrated by the worm 22 and worm wheel 24.

Figure 2:
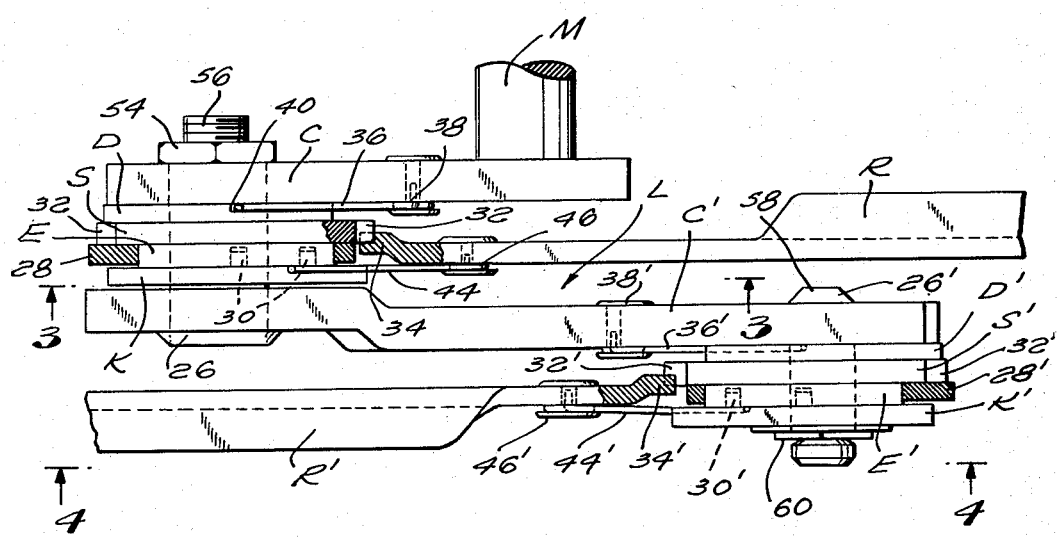
Fig. 2 is a plan view with parts shown in section of the essential elements of the apparatus of the present invention.

Referring now particularly to Fig. 2 of the drawings, the linkage mechanism L comprises a compound crank consisting of a first crank arm C fixed to the motor-operated shaft M, a second crank arm C', fixed to and rotatable with the crank arm C, the two crank arms extending in opposite directions with reference to the axis of rotation of the shaft M and being united together by means of the bolt 26 (in a manner to be later described), a connecting rod R linking the free end of the crank arm C with the right hand windshield wiper W and a connecting rod R' linking the free end of the crank arm C' with the left hand windshield wiper W'.

Each crank arm is connected to its associated connecting rod by an eccentric device which is actuated in a positive manner by mechanism associated therewith for shifting the stroke of the windshield wiper when the motor is reversed in its direction of operation. The eccentric device and its associated mechanism for linking the free end of the crank arm C with the connecting rod R comprises an eccentric E mounted eccentrically in the bolt 26, the connecting rod R being provided with an eccentric strap portion 28 encircling the eccentric E, the said eccentric being integrally formed with an enlarged section forming a stop means S, the said eccentric being further integrally provided with a detent element D. The mechanism further preferably includes a cam element K which in the assembling of the parts is fixed to the eccentric by means of pins 30, 30 formed integrally with the cam K and taken into or received by apertures formed in the eccentric element E. The detent element D and the cam element K are arranged on opposite sides of the eccentric element E. The enlarged portion which forms the stop means S is formed along a diameter with shoulders 32, 32 defining abutments which coact with a lug 34 which is integral with and is preferably pressed from the material of the connecting rod R.

Associated with the detent element D is a spring-urged pawl 36 carried by the crank arm C and anchored thereto as at 38. This spring-urged pawl comprises in its simplest form a leaf spring; and the detent element D may comprise in its simplest form a notched disk provided with the detent notch 40 at a point in its circumference, with which notch coacts a hooked end 42 of the leaf spring pawl 36. The cam K may also comprise a disk-shaped cam; and with this cam there cooperates a spring-urged element also preferably in the shape of a leaf spring 44 carried by the connecting rod R and anchored thereto as at 46.

Figure 3:
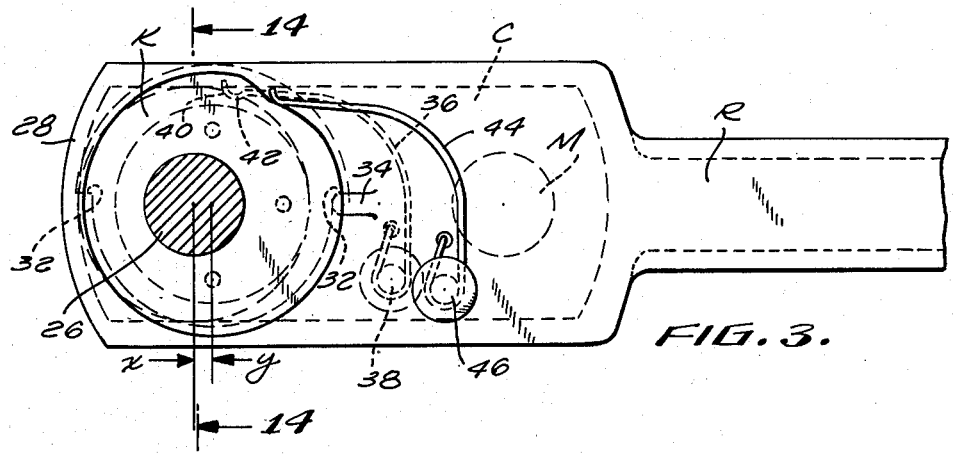
Fig. 3 is a view of that part of Fig. 2 taken in cross-section in the plane of the line 3—3 of Fig. 2.
Figures 14, 15:
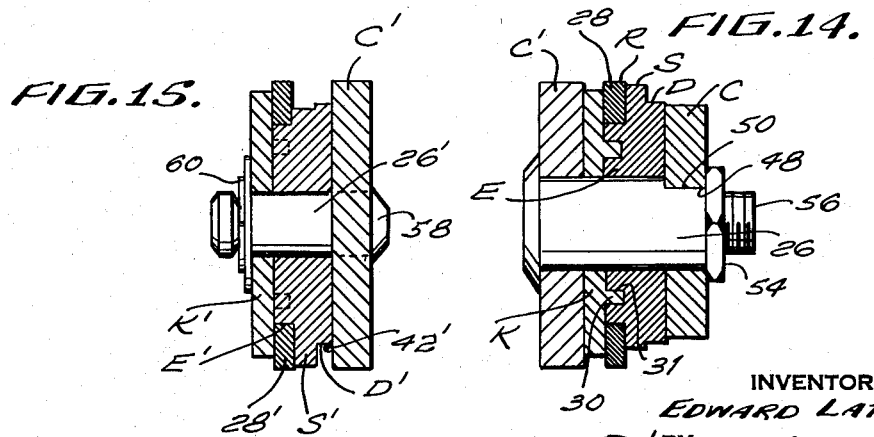
Fig. 14 is a view taken in cross-section in the plane of the line 14—14 of Fig. 3.
Fig. 15 is a view taken in cross-section in the plane of the line 15—15 of Fig. 4.
Figure 13:
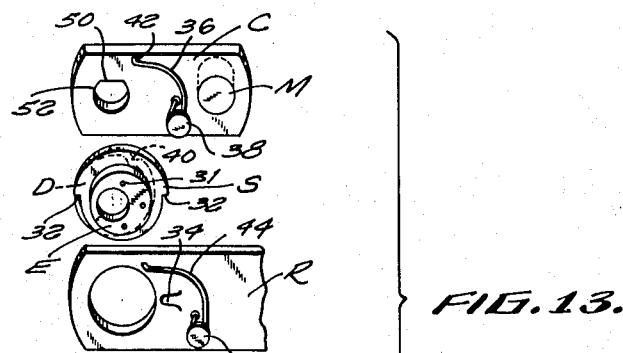
Fig. 13 is an exploded view in perspective of the essential parts of the apparatus depicted in Figs. 5 to 12.

The relation between, as well as the assembly of, these parts just described may best be seen by reference to Figs. 3 and 14 and the exploded view of the parts shown in Fig. 13. The crank arms C and C' are keyed together by the attachment of the bolt 26 to the crank arm C' and the keyed reception of the flattened end 48 of the bolt 26 by the correspondingly flattened part 50 of the receiving aperture 52 in the crank arm C. The eccentric E and its associated parts fixed thereto (the stop element S, the detent element D and the cam K) all mounted eccentrically on the connecting bolt 26 are capable of a rotation over an arc of substantially 180° with reference to the connecting rod R, being stopped in its two positions (in the rotation of 180°) by the engagement between the abutments 32, 32 on the stop disk S with the lug 34 on the connecting rod R. The assembled parts just described are held together by the nut 54 fitted on the threaded end 56 of the bolt 26.

Figure 4:
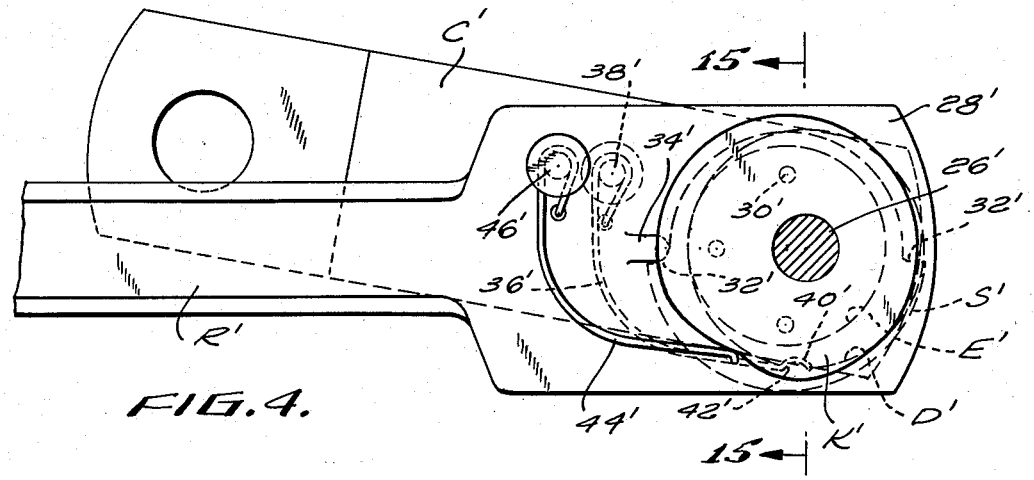
Fig. 4 is a view of that part of Fig. 2 taken in cross-section in the plane of the line 4—4 of Fig. 2.

The eccentric device and associated mechanism for connecting the free end of the crank arm C' with the connecting rod R' are similar in construction and operation to the eccentric device and associated mechanism just described and will, therefore, be merely indicated by similar but primed reference characters. The only (and a minor) difference, is in the pivot bolt 26' which preferably is smaller in diameter than the connecting bolt 26, the said pivot bolt 26' being provided at one end with an enlarged head 58 and at the other end with a formation for receiving a split spring washer 60. It will be observed that where it is desired to oscillate the windshield wiper device in opposite directions (as in the structure illustrated) the connection between the crank arms and the connecting rods are in an opposite sense as will be seen by comparing Figs. 3 and 4 of the drawings.

The diagrammatic or schematic views of Figs. 5 to 12 illustrate the operating sequences of that part of the apparatus employed for operating the right hand windshield wiper W, i. e., that part of the apparatus associated with connecting the crank arm C and the connecting rod R. The parts of the linkage mechanism are separated in these views for explanatory purposes, the crank arm C and associated parts being shown to the right and the connecting rod R and some of its associated parts being shown to the left. The crank arm C is rotatable in either direction of rotation about the axis of the shaft M, as is indicated by the rotating arrows, while the connecting rod R partakes of a reciprocating motion, as is indicated by the double pointed arrows.

Figure 5:
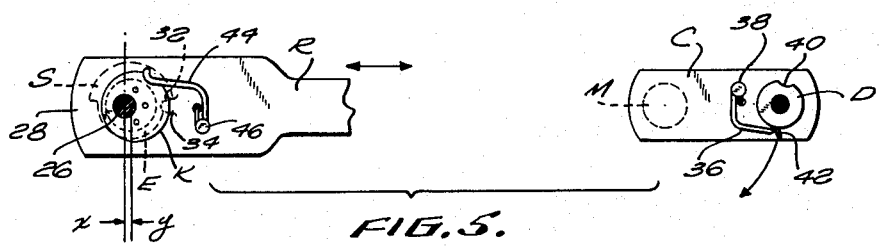
Figs. 5 through 7 are diagrammatic or schematic views showing the position of essential parts of the apparatus during normal running sequence of the apparatus.
Figure 6:
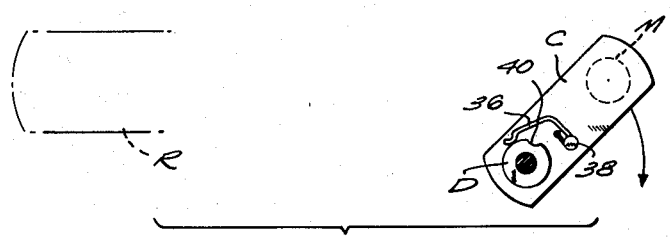
Figure 7:
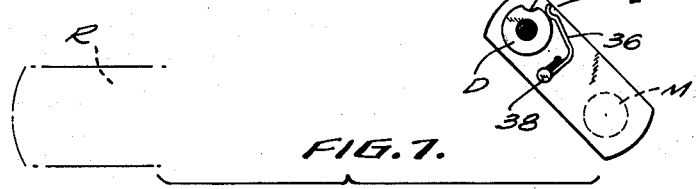

In the normal running sequence illustrated in Figs. 5 to 7 the eccentric E and its associated parts (stop element S, detent D and cam K) remain fixed relative to the connecting rod R. The fixed position shown is determined by the engagement between the abutment 32 and the lug 34 (see Fig. 5). As the crank arm continues to rotate in the direction indicated in Fig. 5 (clockwise) the spring 36 rides on the surface of the detent element D dropping into and pulling out of the notch 40 during each revolution of the crank, as is indicated in the sequential views of Figs. 5, 6 and 7. Any pressure which may be exerted by the spring 36 on the peripheral surface of the detent D exerts a force which tends to maintain the abutments (32, 34) in engagement and thus to maintain the eccentric E in the said position. The crank bolt or pin 26 rotates inside the eccentric E. Since during a running sequence the position of the eccentric E and its associated mechanism with reference to the reciprocating rod R remains unchanged, the relative position of these parts shown in Fig. 5 is not reproduced in Figs. 6 and 7.

Figure 11:
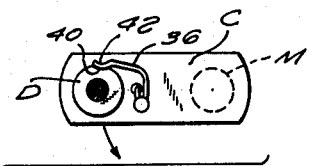
Figure 12:
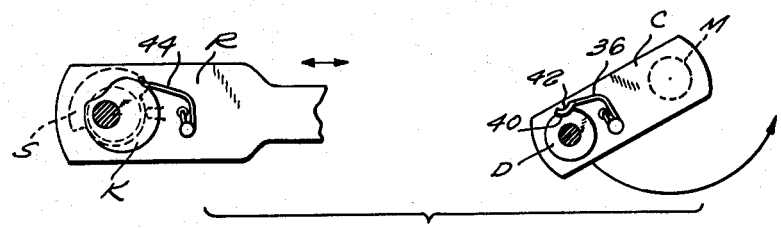

Figs. 8 through 12 illustrate the sequential views during a parking operation. To park the windshield wiper the customary control element is turned to parked position and at that instant the motor 20 reverses rotation, causing the compound crank C, C' to reverse its rotation. This may happen at any position of the crank and such assumed position is selectedly shown in Fig. 8. During the reverse rotation (counter-clockwise) of the crank C initiated in this Fig. 8 the spring 36 slides over the peripheral surface of the detent element D as is indicated in the sequential views of Figs. 8, 9 and 10 until the hook end of the spring 36 engages the notch 40 of the detent element. When this engagement takes place the detent element D is positively actuated or rotated during the remainder of the rotation of the crank C, this being from the position shown in Fig. 10 through positions as shown in Fig. 11 to the position shown in Fig. 12, at which latter position the customary limit switch is operated (as by the repositioning of the connecting rod R) to cut off the current supply to the motor 20 thereby stopping the parts in the parked position.

Figure 8:
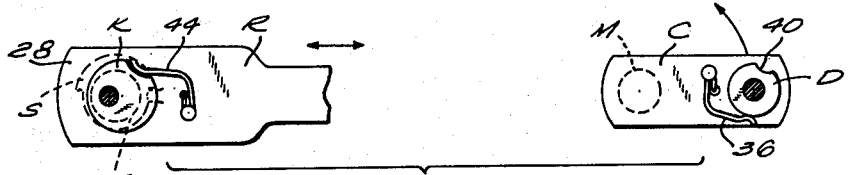
Figs. 8 through 12 are diagrammatic or schematic views showing the position of the essential parts of the apparatus during a parking sequence of the apparatus which takes place upon a reversal of direction of operation of the motor.
Figure 9:
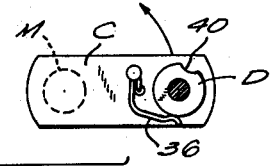
Figure 10:

The operation just described results in the shifting of the stroke of the connecting rod R without changing its amplitude effective to move the windshield wiper (D) to its parked position. This is illustrated in the left hand schematic views of Figs. 8 to 12 of the drawings. At the initiation of the operation the eccentric device and its associated mechanism are still in the position shown in Figs. 5 to 7, as is illustrated in Fig. 8; and these parts remain in this position through the operating sequence depicted sequentially in Figs. 8, 9 and 10. When the spring 36 engages the detent device D, and in the further rotation of the cam C moves this detent positively from the position shown in Fig. 10 to that shown in Fig. 12 the eccentric E is rotated 180° from the position shown in Fig. 10 (Fig. 8) through intermediate positions illustrated in Fig. 11 and to the position shown in Fig. 12, where it is stopped by the engagement of the other side abutment 32 with the lug 34. This 180° movement of the eccentric and its associated mechanism causes the rod R to be shifted to the left from the position of Fig. 5 to that of Fig. 12, a distance which is double the eccentricity of the eccentric. In Fig. 5 this eccentricity is indicated by the arrows x, y, x being the axis of the crank pin and y being the center of the eccentric; and in Fig. 12 this eccentricity is reversed as is indicated by the arrows y, x. The result is that the connecting rod R is shifted to the left (as viewed in these figures) and in an amount to move the windshield wiper W to its parking position.

To start the windshield wiper from its parked position the rotation of the motor is again reversed so that it is rotated in its normal direction. Since the spring 36 is engaged with the notched detent element D the rotation of the cam C (see Fig. 12) in its reverse or clockwise direction causes the detent D and, therefore, the eccentric E. fixed thereto, to rotate with reference to the connecting rod R until the first-mentioned abutment 32 engages the lug 34 in the position shown in Fig. 8 of the drawings, at which time the spring 36 disengages the notch of the detent element D and the cam C then continues its rotation in the manner explained with reference to Figs. 5 through 7.

In these described operations the additional cam K and its associated spring 46 serve to hold the eccentric in its position upon reversal of the motor-operated shaft from its normal running condition until engagement of the spring pawl 36 and the detent D takes place. Thus, the spring 44 in engagement with the cam K functions to hold the eccentric E (when it would otherwise be in a condition to move) as the crank C is rotated (counter-clockwise) through the positions of Figs. 8, 9 and 10. When the engagement of the spring 36 with the detent element D takes place, the positive action therebetween serves to overcome the holding action of the spring 44 and the cam K thereby permitting these parts to move through the positions of Figs. 9 to 12 of the drawings.

The provision of this described mechanism with a compound crank enables a unit apparatus to be devised which may be readily assembled between the motor-operated shaft and the left and right windshield wipers of a motor vehicle.

The construction and operation of the electric windshield wiper apparatus of the present invention will in the main be fully apparent from the above-detailed description thereof. By means of this apparatus both windshield wipers of a motor vehicle may be operated in a positive manner and in synchronism with relatively simple equipment. The operation to the parking position and the return operation from a parking position to a normal operating condition may also be accomplished by a simple mechanism.

It will also be apparent that while I have described the improved windshield wiper apparatus by reference to an exemplified structure, that changes may be made in such apparatus without departing from the spirit of the invention defined in the following claims.

I claim:

1. An electric windshield wiper apparatus for connection with an oscillatable windshield wiper device comprising a reversible motor-operated shaft, a crank arm fixed to the shaft, a connecting rod for linking the free end of the crank arm and the oscillatable windshield wiper device, the connecting rod being connected to the free end of the crank arm by means comprising an eccentric rotatable in the connecting rod between two positions, stop means on the eccentric and the connecting rod for holding the eccentric in either one or the other of said positions, movement of the eccentric from one to the other of its said positions having the effect of shifting the operating stroke of the connecting rod, a detent element and a cam element fixed to the eccentric, a spring-urged element carried by the connecting rod and acting on the cam element, a spring-urged pawl carried by the crank arm and acting on the detent element, rotation of the crank arm in either direction causing the pawl and detent element to engage and effect the rotation of the eccentric, when the latter is free to move, from one to the other of its said positions, the pawl being free to ride about and over the detent element when the eccentric is located in one of its said stopped positions, the spring-urged element and cam acting to hold the eccentric upon reversal of the motor-operated shaft from its normal running condition until engagement of the pawl and detent element takes place.

2. The electric windshield wiper apparatus of claim 1 in which the detent element and the cam element are located on opposite sides of the eccentric.

3. The electric windshield wiper apparatus of claim 1 in which the detent element comprises a notched disc, the cam element comprises a disc cam and the spring-urged pawl element comprises leaf springs.

4. An electric windshield wiper apparatus for connection with right and left oscillatable windshield wiper devices comprising a reversible motor-operated shaft, a compound crank fixed to the shaft having arms extending in opposite directions, connecting rods for linking the free ends of the crank arms and the right and left oscillatable windshield wiper devices, each connecting rod being connected to the free end of one of the crank arms by similar means each comprising an eccentric rotatable in the connecting rod between two positions, stop means on the eccentric and the connecting rod for holding the eccentric in either one or the other of said positions, movement of the eccentric from one to the other of its said positions having the effect of shifting the operating stroke of the connecting rod, a detent element and a cam element fixed to the eccentric, a spring-urged element carried by the connecting rod and acting on the cam element, a spring-urged pawl carried by the crank arm and acting on the detent element, rotation of the crank arm in either direction causing the pawl and detent element to engage and effect the rotation of the eccentric, when the latter is free to move, from one to the other of its said positions, the pawl being free to ride about and over the detent element when the eccentric is located in one of its said stopped positions, the spring-urged element and cam acting to hold the eccentric upon reversal of the motor-operated shaft from its normal running condition until engagement of the pawl and detent element takes place.

5. The electric windshield wiper apparatus of claim 4 in which the connections between the crank arms and the connecting rods are in opposite sense whereby the windshield wiper devices are simultaneously oscillatable in opposite directions.

References Cited in the file of this patent

UNITED STATES PATENTS

| | | |
|---|---|---|
| 2,153,030 | Venable | Apr. 4, 1939 |
| 2,308,212 | Scott-Iversen | Jan. 12, 1943 |
| 2,537,335 | Edwards | Jan. 9, 1951 |
| 2,512,051 | Felt | Sept. 30, 1952 |
| 2,667,249 | Bell et al. | Jan. 26, 1954 |

FOREIGN PATENTS

| | | |
|---|---|---|
| 200,759 | Great Britain | July 19, 1923 |